UNITED STATES PATENT OFFICE.

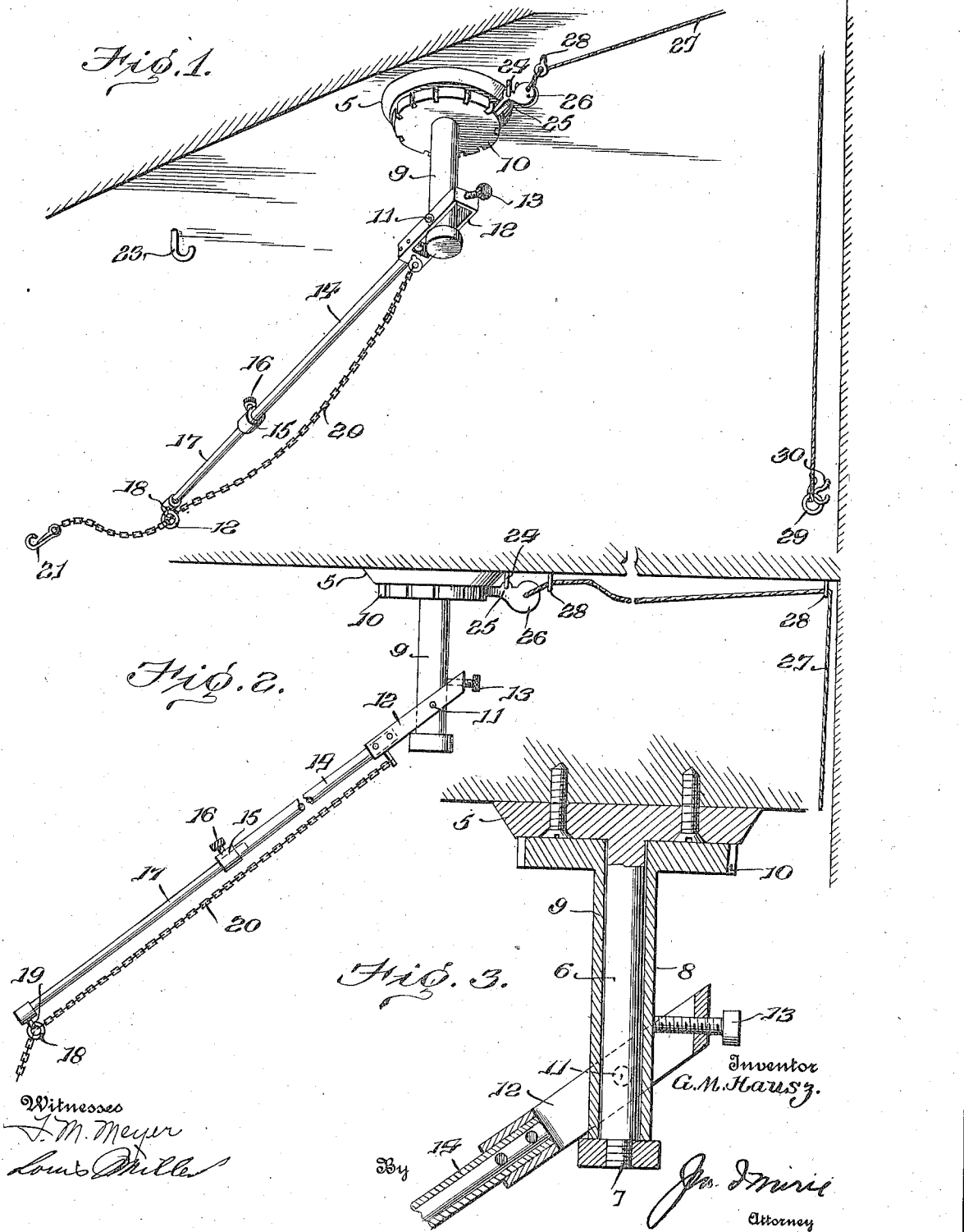

GEORGE M. HAUSZ, OF FORT ATKINSON, WISCONSIN.

RESTRAINING DEVICE FOR ANIMALS.

1,181,881.  Specification of Letters Patent.  Patented May 2, 1916.

Application filed July 28, 1915. Serial No. 42,372.

*To all whom it may concern:*

Be it known that I, GEORGE M. HAUSZ, citizen of the United States, residing at Fort Atkinson, in the county of Jefferson and State of Wisconsin, have invented certain new and useful Improvements in Restraining Devices for Animals, of which the following is a specification.

This invention relates to restraining devices for animals and more particularly to that class of such devices adapted to tether cattle when it is desired to place the same in stalls or similar inclosures.

The primary object of this invention is the construction of such a device which shall be adapted to give the animal tethered thereby freedom within a limited area, which may be adjusted to fit the size of the inclosure.

A further object of the invention is the provision of means whereby the tethering device may be adjusted for large or small animals.

A still further object is to provide means operable from a distance whereby the area of freedom of the animal may be entirely restricted and the animal held in one place.

With these and other objects in view as will hereinafter appear, the invention consists in the peculiar arrangement and combination of the various coöperating elements of an animal tether as hereinafter described and more particularly set forth in the appended claims.

Referring to the drawings forming a portion of this specification and illustrating the preferred embodiment of the invention, and in which similar reference characters indicate similar parts wherever used:—Figure 1 is a perspective view of the device in position upon a stall roof. Fig. 2 is a side elevation showing the hitching bar extended. Fig. 3 is a detail section.

5 designates a metal plate adapted to be secured to a stall roof in any suitable manner and supporting a member 6, preferably round and threaded at its lower end 7. Inclosing the member 6 and supported thereon by means of a hub 8, is a sleeve 9, carrying a toothed wheel 10, at the upper end thereof. Pivotally mounted at 11, on the sleeve 9, is an L-shaped member 12, provided with a set screw 13, bearing against the sleeve 9. Secured in any suitable manner to the L-member 12, is a hollow rod 14, provided at its outer end with a flange 15, having a set screw 16. The rod 14 is adapted to receive internally a second rod 17, which telescopes within the hollow rod 14, and is held in proper position by the set screw 16. The outer end of the rod 17 has an eye 18, carrying a ring 19, through which passes a chain 20, provided with a snap hook 21, of any suitable type. The inner end of the chain 20 is fastened at 22 to the L-member 12, by any proper fastening device.

A hook 23 is provided within the stall ceiling so that when it is desired, the rod 17 may be placed thereon, thus swinging the L-member 12 upon its pivot and the corresponding members carried thereby up and out of the way of the occupants of the stall.

Pivotally mounted at 24, upon an extension 25 of the plate 5, is a small lever 26, so arranged as to be held normally out of engagement with the teeth of the wheel 10, by means of a cord or suitable flexible connection 27, passing through eyes 28—28, and provided with a terminal ring 29, adapted to engage a hook 30.

The operation of the device is as follows:—The animal is tethered by means of the chain 20, and snap-hook 21, the rod 17 being regulated to the proper distance to allow for freedom of movement, the height of the tether being regulated by means of the set screw 13, operating to raise or lower the L-member 12 upon its pivot 11. Thus tethered, the animal is free to move around, the device revolving upon the member 6, thus permitting freedom within an area limited to the sweep of the extension arm 17. When it is desired to cause the animal to stand still the cord 27 is removed from the hook 30, thus releasing the pull upon the lever 26, and permitting it to come into engagement with the toothed wheel 10, thus preventing rotation thereof and correspondingly of the parts connected thereto, as shown in dotted lines in Fig. 1.

I realize that considerable variation of the specific details as herein set forth may be resorted to without departing from the spirit of the invention, and it is not my intention to limit myself to the construction shown and described herein, but to construe the following claims as broadly as the state of the prior art will permit.

What I claim is:—

1. In a device of the character described, the combination with a depending support, of tethering means movable about said depending support, and means adapted to restrict the movement of the tethering means.

2. In a device of the character described, the combination with a depending support, of a member rotatable upon said depending support, tethering means carried by said member, and means for holding said member against rotation.

3. In a device of the character described, the combination with a depending support, of a member rotatable upon said depending support, tethering means carried by said member, means including a latch between said member and the support for holding said tethering means against rotation and means for adjusting the height of said tethering means independently of the height of the support.

4. In a device of the character described, the combination with a depending support, of a member rotatable upon said depending support, means adapted to prevent rotation of said member, tethering means carried by said member, and means for adjusting the length of said tethering means independent of the height of the support.

5. In a device of the character described, the combination with a support, of an extension on said support, a sleeve rotatable upon said extension, means for removably mounting said sleeve on said extension, a toothed wheel mounted on the sleeve, means adapted to engage said wheel to prevent rotation thereby, and tethering means carried by said sleeve.

6. In a device of the character described, the combination with a support, of an extension on said support, a sleeve rotatable upon said extension, means for removably mounting said sleeve on said extension, a serrated member integral with said sleeve, means adapted to engage said serrated member to prevent rotation thereof, a member pivoted to said sleeve and rotatable therewith, a hollow rod carried by said member, a second rod in telescopic engagement with said first named rod, and animal receiving means carried by said rods.

7. In a device of the character described, the combination with a support, of an extension on said support, a sleeve rotatable upon said extension, means for removably mounting said sleeve on said extension, a serrated member integral with said sleeve, a member pivoted to said sleeve and rotatable therewith, a hollow rod carried by said member, a second rod in telescopic engagement with said first named rod, means adapted to engage said serrated member to prevent rotation thereof and the parts attached thereto.

8. In a device of the character described, the combination with a support, of an extension on said support, a sleeve rotatable upon said extension, means for removably mounting said sleeve on said extension, a serrated member integral with said sleeve, a member pivoted to said sleeve and rotatable therewith, a hollow rod carried by said member, a second rod in telescopic engagement with said first named rod, flexible animal fastening means secured to each of said rods, means adapted to engage said serrated member to prevent rotation thereof and the parts attached thereto, and means for causing said means to disengage said serrated member to permit of rotation thereof.

In testimony whereof I affix my signature in presence of two witnesses.

GEORGE M. HAUSZ.

Witnesses:
ALWIN L. STENGEL,
HAROLD BERGMANN.

Copies of this patent may be obtained for five cents each, by addressing the "Commissioner of Patents, Washington, D. C."